United States Patent [19]

Mieno et al.

[11] Patent Number: 4,882,695
[45] Date of Patent: Nov. 21, 1989

[54] CONTROL SYSTEM FOR IGNITION TIMING AND BOOST PRESSURE IN INTERNAL COMBUSTION ENGINE

[75] Inventors: Toshiyuki Mieno; Toyohei Nakajima; Akira Nagao, all of Wako, Japan

[73] Assignee: Honda Giken Kogyo Kabushiki Kaisha, Tokyo, Japan

[21] Appl. No.: 109,363

[22] Filed: Oct. 19, 1987

[30] Foreign Application Priority Data

Oct. 20, 1986 [JP] Japan .............................. 61-248890

[51] Int. Cl.$^4$ .......................... F02B 37/00; F02P 5/15
[52] U.S. Cl. .................................. 364/431.08; 60/602; 60/611; 123/425
[58] Field of Search ...................... 364/431.08; 60/602, 60/603, 611; 123/425, 435

[56] References Cited

U.S. PATENT DOCUMENTS

| | | | |
|---|---|---|---|
| 4,322,948 | 4/1982 | Emmenthal et al. | 60/602 |
| 4,375,668 | 3/1983 | Leung et al. | 364/431.008 |
| 4,387,571 | 6/1983 | Katsumata et al. | 60/602 |
| 4,449,367 | 5/1984 | Moriguchi et al. | 60/602 |
| 4,594,983 | 6/1986 | Takahashi et al. | 60/602 X |
| 4,612,900 | 9/1986 | Iwata et al. | 60/602 X |
| 4,646,522 | 3/1987 | Mamiya et al. | 60/602 |
| 4,715,184 | 12/1987 | Oosawa et al. | 60/602 |

Primary Examiner—Felix D. Gruber
Attorney, Agent, or Firm—Armstrong, Nikaido, Marmelstein, Kubovcik & Murray

[57] ABSTRACT

A control system for ignition timing and boost pressure in an internal combustion engine equipped with a turbocharger. The system has a device for detecting knocking in the respective cylinders and the result of the detection by this a device is used as the basis for calculating the ignition timing for each cylinder. When the mean ignition timing calculated from the ignition timings for all cylinders exceeds a prescribed reference value, the boost pressure is reduced. Alternatively, the boost pressure is immediately reduced when the most retarded of the ignition timings exceeds the prescribed value in the direction of retardation, irrespective of whether or not the average value exceeds the prescribed value. As a result, reduction of engine output can be minimized while precluding damage to the engine.

2 Claims, 6 Drawing Sheets

| Ne\Pb | Pb1 | Pb2 | ---------- | Pbj |
|---|---|---|---|---|
| Ne1 | θT11 | θT12 | | θT1j |
| Ne2 | θT21 | θT22 | | θT2j |
| ¦ | | | | |
| Nei | θTi1 | θTi2 | | θTij |

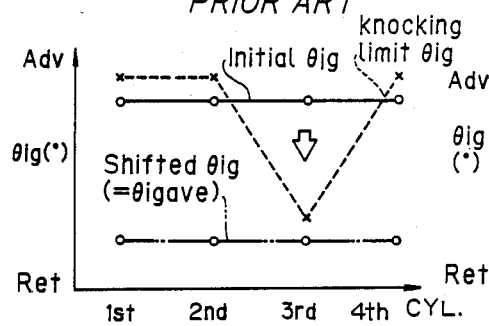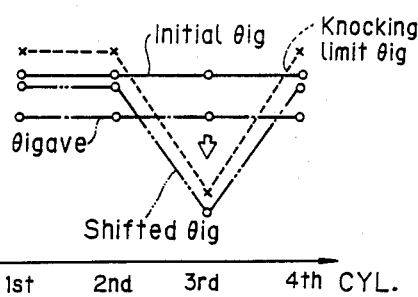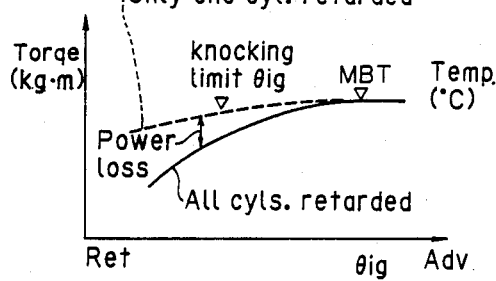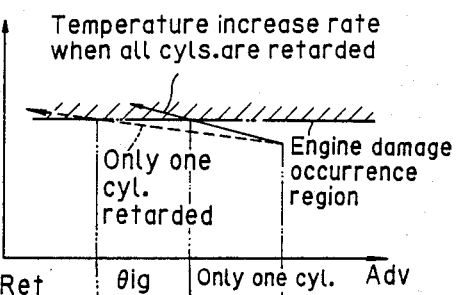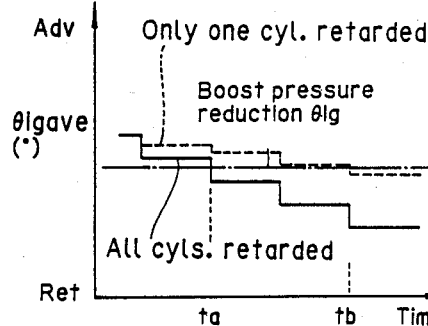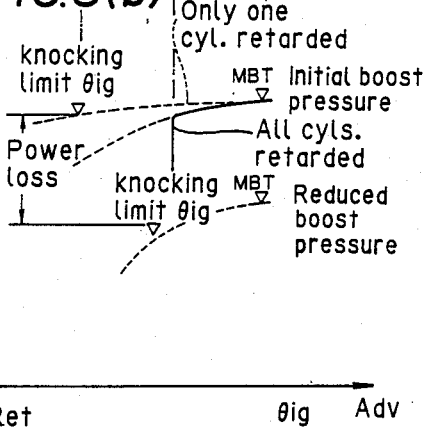

CONTROL SYSTEM FOR IGNITION TIMING AND BOOST PRESSURE IN INTERNAL COMBUSTION ENGINE

BACKGROUND OF THE INVENTION

1. Field of the Invention

This invention relates to a control system for ignition timing and boost pressure in an internal combustion engine and more particularly to a control system for ignition timing and boost pressure in a multicylinder internal combustion engine equipped with a turbocharger.

2. Description of the Prior Art

In the conventional multicylinder internal combustion engine equipped with a turbocharger, the ignition timing is set the same for all cylinders of the engine. As a result, when knocking occurs, it is eliminated by retarding the ignition timing of all the cylinders, and when the retardation comes to exceed a prescribed amount, the boost pressure is then reduced. This is the technique used in, for example, Japanese Laid-Open Patent Application No. 58(1983)-167881.

As a multicylinder internal combustion engine equipped with a turbocharger is subject to a large thermal load, it is highly susceptible to damage caused by knocking. It is therefore necessary to monitor the state of combustion in the engine combustion chambers so as to detect the occurrence of knocking and, when knocking is detected, to eliminate it as quickly as possible. At the same time, however, unless the engine is operated at an ignition timing which is as close as possible to the knocking limit, it is not possible for the turbocharger to produce the increase in power output for which it was installed, greatly reducing the significance of its installation. Moreover, the conditions under which knocking occurs are not generally the same for all cylinders of the engine and it is frequently found that knocking occurs in one and the same cylinder only. In the prior art technique, since the ignition timing is the same for all cylinders, retardation of the ignition timing to eliminate knocking results in retardation of the ignition timing in all cylinders, including those in which no knocking has occurred. Then when the retardation comes to exceed the prescribed amount, the boost pressure is reduced. As a result, the engine output is lowered more than necessary. Moreover, when the ignition timing is retarded, the period during which combustion is possible in the combustion chambers is shortened and this results in unburned air/fuel mixture being passed into the exhaust system, where it burns and increases the temperature of the exhaust gases. In the conventional technique, since the ignition timing is retarded for all cylinders even though knocking has occurred in only one, the amount of unburned gas generated becomes proportionately larger, resulting in an increase in exhaust temperature and a corresponding increase in the risk of damage to the engine. Also, as the conventional system determines the boost pressure reduction timing solely on the basis of the amount of ignition retardation implemented for elimination of knocking, it has been criticized for its inability to realize engine control which directly reflects changes in engine operating conditions or changes in the operating environment.

SUMMARY OF THE INVENTION

In consideration of the foregoing shortcomings of the prior art, one object of this invention is to provide a system for controlling ignition timing and boost pressure in an internal combustion engine wherein unnecessary reduction of engine output is prevented and the risk of damage to the engine from increased exhaust temperature is decreased by determining the boost pressure reduction timing until after the ignition timing, including any ignition timing retardation carried out in the respective cylinders for elimination of knocking, has been determined.

Another object of the invention is to provide a system for controlling ignition timing and boost pressure in an internal combustion engine wherein the boost pressure reduction timing is determined, not on the basis of the knocking adjustment amount alone, but with reference to the actual ignition timing including any knocking adjustment amount, thus better enabling direct reflection in the engine control of changes in operating and environment conditions.

For achieving the objects, the present invention provides a system for controlling ignition timing and boost pressure in an internal combustion engine, comprising: a device for detecting an operating condition of a multicylinder internal combustion engine, a device for detecting the state of combustion in each combustion chamber of the multicylinder internal combustion engine, a device for detecting occurrence of knocking in each cylinder of the internal combustion engine on the basis of the output from the combustion state detecting device, a device for calculating ignition timing for each cylinder on the basis of the outputs of the knocking detection device and the operating condition detecting device, a device for controlling boost pressure in an engine air intake passage on the basis of the outputs of the ignition timing calculation device and the operating condition detection device, and an actuator device for adjusting the boost pressure in the engine air intake passage in response to the output from the boost pressure control device. In the system, the occurrence of knocking is detected for each cylinder, the ignition timing being retarded only for those cylinders in which knocking occurred, and the boost pressure is reduced when the mean value of the actual ignition timing after retardation is more retarded than a prescribed value.

BRIEF DESCRIPTION OF THE DRAWINGS

FIGS. 6a, 6b, 7, 8a, 8b and 9 are explanatory diagrams comparing the operation of the system of this invention with the prior art.

DESCRIPTION OF THE PREFERRED EMBODIMENTS

Embodiments of the invention will now be explained with reference to the drawings.

Figure 1:
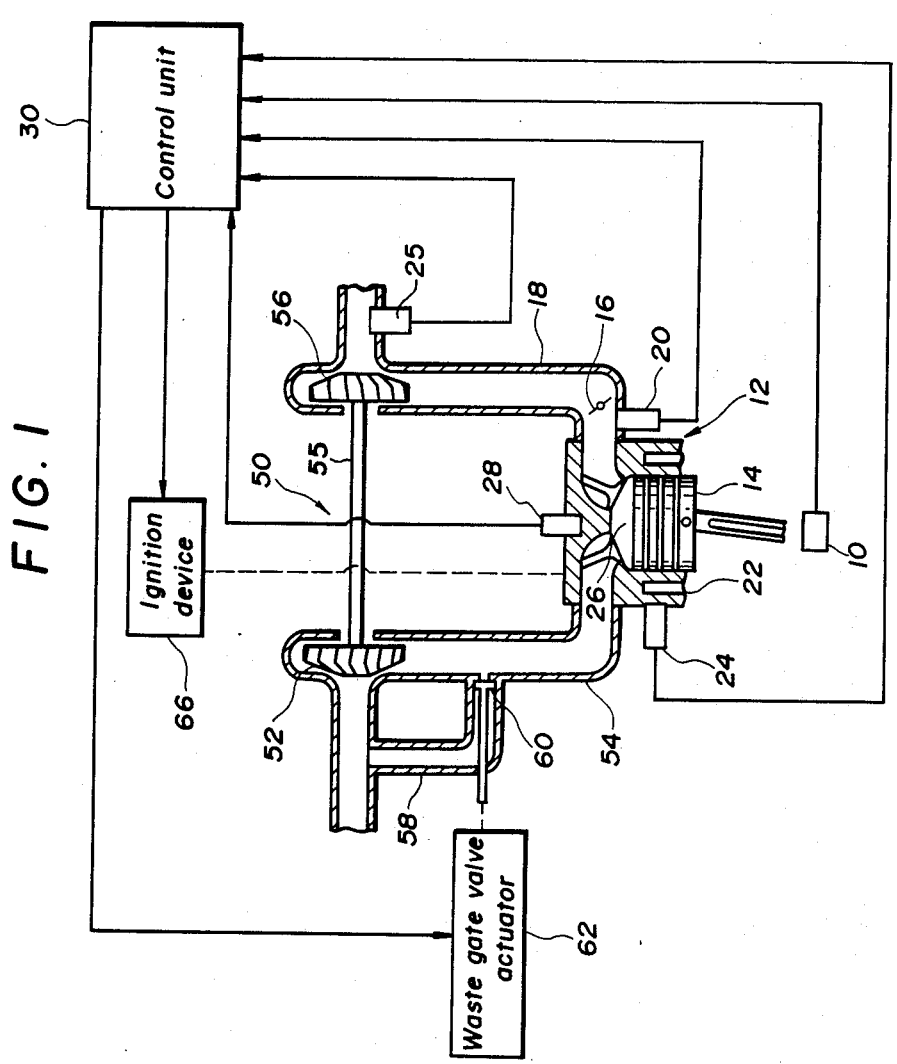
FIG. 1 is a schematic view of the overall arrangement of the control system of the present invention.

FIG. 1 shows the overall arrangement of a system for controlling ignition timing and boost pressure in a turbocharged internal combustion engine according to the invention. As shown in the figure, a crankshaft angle sensor 10, which may be constituted using an electromagnetic pickup or the like, is disposed in the vicinity of a rotating member of a four-cylinder internal combustion engine 12 for detecting changes in the crankshaft angle of the internal combustion engine 12 caused by reciprocating movement of pistons 14 (only one shown).

The sensor 10 produces a cylinder identification signal once per predetermined angle of rotation of the crankshaft, namely, every 720 degrees rotation of the engine crankshaft during which one cycle of power strokes is completed in the order of, for example, the first, third, fourth and second cylinders. It also produces TDC signals once every 180 degrees rotation of the crankshaft at the time the respective pistons reach TDC, and further at predetermined angle intervals produces prescribed unit angle signals as subdivisions of the TDC angle signals. Therefore, by counting the number of TDC angle signals following production of the cylinder identification signal, it is possible to discriminate which cylinder is at TDC at the time each TDC signal is produced. Further, the engine speed can be calculated from the unit angle signals.

A throttle valve 16 is provided in an air intake passage 18 of the internal combustion engine 12 and a pressure sensor 20 is provided downstream of the throttle valve 16 for detecting the absolute pressure of air flowing at this point. On a cylinder block 22 of the engine there is mounted a coolant temperature sensor 24 for detecting the temperature of the engine coolant. Similarly, a temperature sensor 25 is disposed at an appropriate part of the air intake passage 18 for detecting the temperature of the intake air. The internal combustion engine 12 is further provided in the vicinity of each combustion chamber 26 with a knocking sensor 28 comprising a piezoelectric element for sensing the state of combustion of an air/fuel mixture in the combustion chamber 26. Alternatively, instead of providing a knocking sensor 28 for each of the four combustion chambers 26, it is possible to provide only a single knocking sensor 28 for all of the combustion chambers 26 and to determine which cylinder is at the TDC position at the time knocking occurs on the basis of the output of the crankshaft angle sensor 10. The output of the knocking sensor 28 is sent to a control unit 30.

Figure 2:
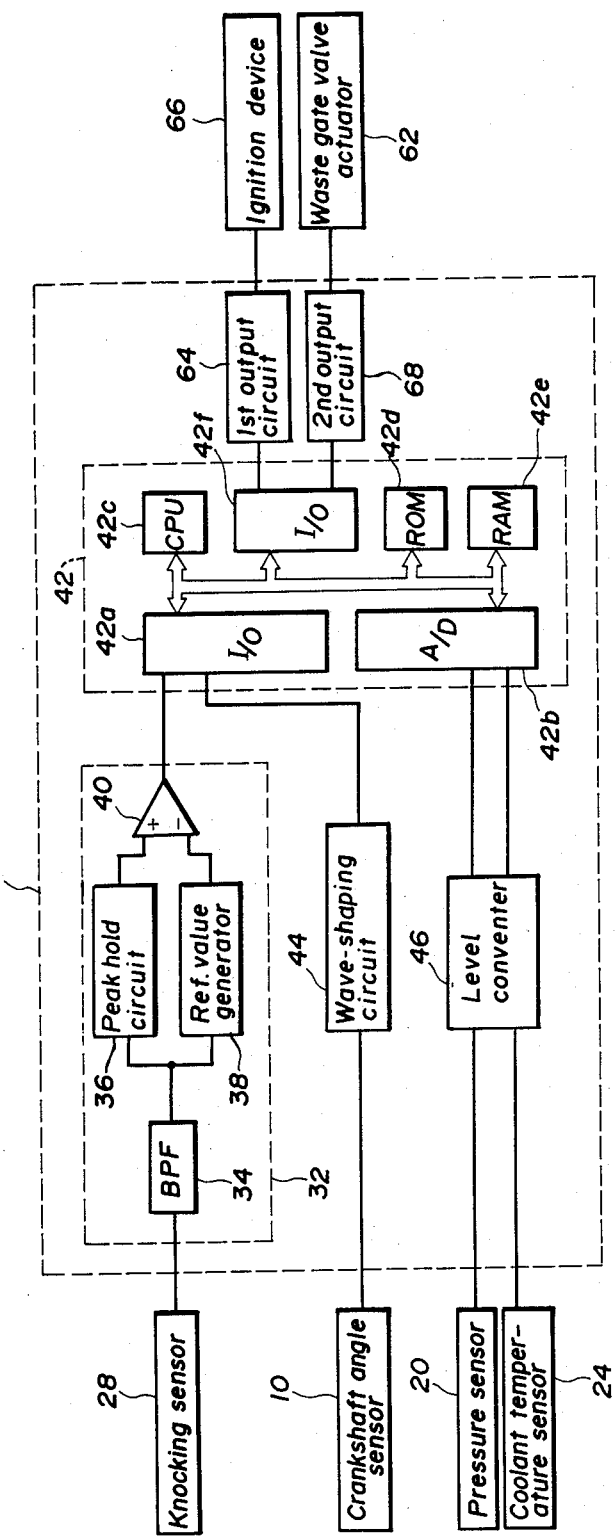
FIG. 2 is a block diagram showing the detailed structure of a control unit of the control system.

The detailed arrangement of the control unit 30 is shown in FIG. 2. In the control unit 30, the signal from the knocking sensor 28 is sent to a knocking detection circuit 32 where it is initially input to a band pass filter 34 for passing through frequency components including the knocking frequency component. The output of the band pass filter 34 is, on the one hand, sent to a peak hold circuit 36 where the peak value of the knocking signal is detected and held. It is also forwarded to a comparison reference value generator 38 where the mean value of the signal from the knocking sensor 28 is determined. The outputs of the peak hold circuit 36 and the comparison reference value generator 38 are sent to a comparator 40 where the two outputs are compared and, when the peak value exceeds the mean value, it is determined that knocking has occurred. The stage following the knocking detection circuit 32 is a microcomputer 42. The main components of the microcomputer 42 are an input panel 42a, an A/D (analog/digital) converter 42b, a CPU (central processing unit) 42c, a ROM (read-only memory) 42d, a RAM (random access memory) 42e and an output panel 42f. The output of the knocking detection circuit 32 is input to the microcomputer 42 and stored in the RAM 42e.

The output of the crankshaft angle sensor 10 is also input to the control unit 30, wherein it is first shaped by a wave-shaping circuit 44 and then input to the microcomputer 42 via the input panel 42a for storage in the RAM 42e. The outputs from the pressure sensor 20 and the intake air temperature sensor 25 are also input to the control unit 30 where they are first level-converted to a predetermined level in a level converter 46 and then converted to digital form by the A/D converter 42b, whereafter they are stored in the RAM 42e.

Returning to FIG. 1, the internal combustion engine 12 is equipped with a turbocharger 50. Specifically, a turbine 52 disposed in an exhaust passage 54 drives a compressor 56 via a shaft 55 and the compressor 56 forces pressurized intake air into the combustion chamber 26. The exhaust passage 54 is provided with a by-pass 58 and a waste gate valve 60 is provided at the branching point between the exhaust passage 54 and the bypass 58. The waste gate valve 60 is connected with a waste gate valve actuator 62 which operates to open and close the waste gate valve 60 to regulate the amount of exhaust gas passing through the bypass 58 and thus regulate the boost pressure. More specifically, when the waste gate valve 60 is opened, the boost pressure is reduced. There is also provided a regulating means such as a relief valve (not shown) for preventing the boost pressure from rising above a prescribed level.

In the system arranged in the aforesaid manner, the CPU 42c of the microcomputer 42 calculates the engine speed from the output of the crankshaft angle sensor 10, and using the calculated engine speed and the output of the pressure sensor 20 as address data retrieves a basic ignition timing for the respective cylinders from the map stored in the ROM 42d. It also adjusts the so-determined basic timing on the basis of the output of the temperature sensors 24 and 25 and further, from the output of the knocking detection circuit 32, calculates an adjustment amount for knocking prevention which it uses to adjust the ignition timing to its final value. As shown in FIG. 2, an ignition command based on the final ignition timing is sent via a first output circuit 64 to an ignition device 66 constituted of an igniter and a distributor (neither shown), thus igniting an air/fuel mixture in the combustion chamber 26 via an ignition plug (not shown). As will be explained in greater detail later, the CPU 42c also sends a command to the waste gate valve actuator 62 via a second output circuit 68, whereby the opening of the waste gate valve 60 is regulated for controlling the boost pressure.

Figure 3:
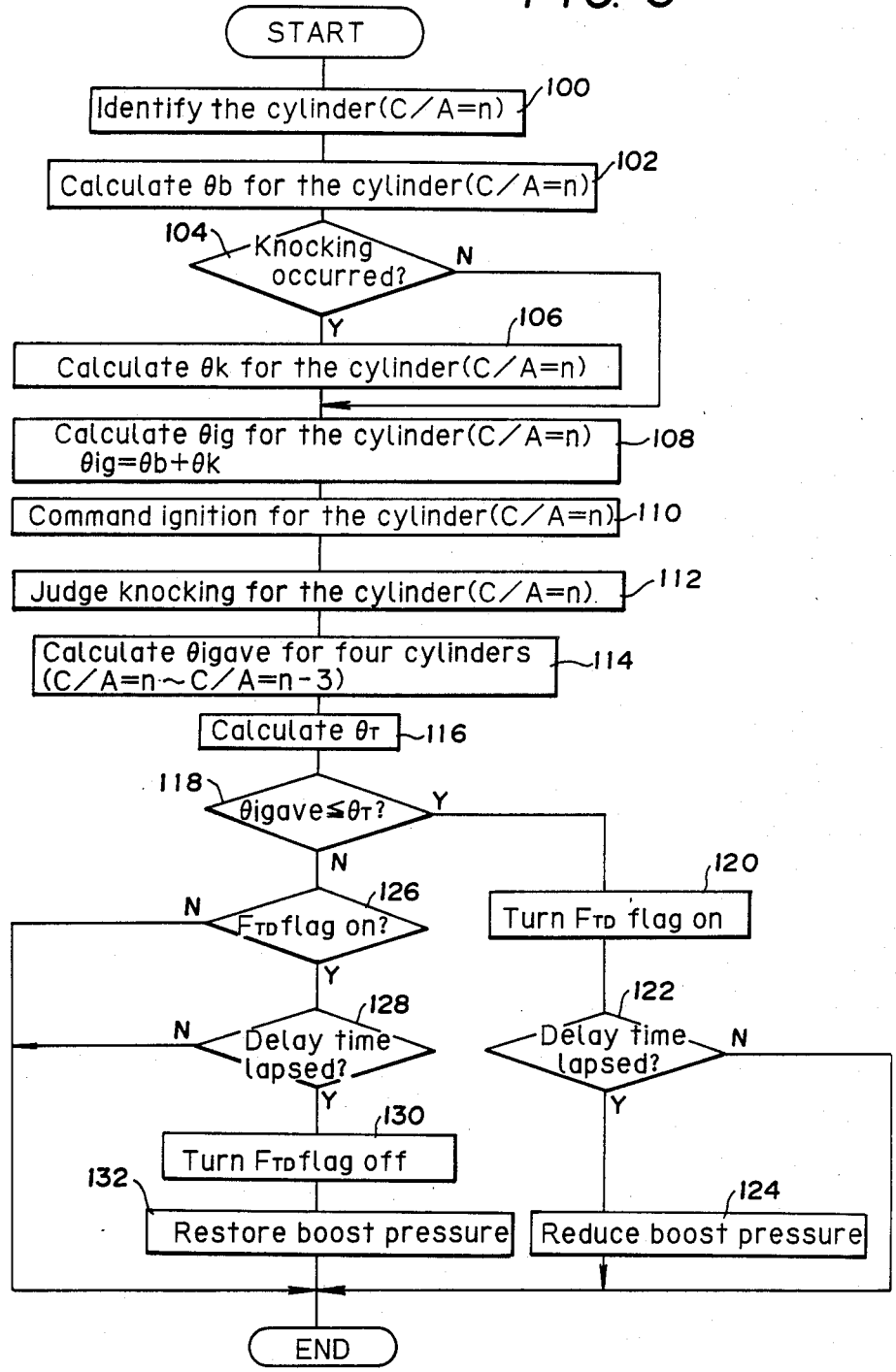
FIG. 3 is a flow chart showing the operation of the control unit.

The operation of the system will now be explained with reference to the flowchart of FIG. 3. This program is started at a prescribed crankshaft angle or at prescribed time intervals.

In step 100 the cylinder is identified on the basis of the cylinder identification signal and the TDC signal output by the crankshaft angle sensor 10, and the cylinder is assigned an address C/A=n.

Then, in the following step 102, the basic ignition timing $\theta$b for the cylinder concerned (C/A=n) is calculated. This calculation is made in the microcomputer 42 by the CPU 42c, which calculates the engine speed from the unit angle signal received from the crankshaft angle sensor 10 and uses the result of this calculation and the pressure value detected by the pressure sensor 20 as address data for retrieving the basic ignition timing from the basic control map stored in the ROM 42d.

The procedure then advances to step 104 where it is determined whether or not knocking has occurred. This is done by reading the knocking data stored in the RAM 42e during the previous firing of the cylinder concerned (C/A=n) and if it is found that knocking has occurred, the procedure moves to step 106 where a knocking adjustment amount $\theta k$ for the cylinder concerned (C/A=n) is retarded by, for example, one degree each time knocking is detected.

Then, in the next step 108, the actual ignition timing $\theta ig$ for the cylinder concerned (C/A=n) is calculated. This is done by adding the knocking adjustment amount $\theta k$ to the basic ignition timing calculated in the step 102 and then appropriately adding to this sum an adjustment amount determined by calculating a temperature compensation value based on the outputs of the coolant temperature sensor 24 and the temperature sensor 25. When the adjustment amount is in the direction of ignition retardation, it is defined as being negative, and when in the direction of ignition advance, as being positive. When knocking is not detected in the step 104, the procedure moves directly to the step 108. In the case where this occurs immediately after avoidance of knocking, however, appropriate adjustment is carried out in the step 108 for returning the ignition in the direction of advance.

The procedure then moves to step 110 where an ignition command is sent to the cylinder concerned (C/A=n) and then to step 112 where it is determined whether or not knocking occurred in the cylinder concerned during the current firing. In carrying out the task the CPU 42c sends a command through the output panel 42f instructing the peak hold circuit 36 to hold the peak value output by the band pass filter 34 during a prescribed period after ignition and causes the comparator 40 to compare the peak hold value with the output of the comparison reference value generator 38, this output representing the mean value of the output of the band pass filter 34 over a prescribed period. The result of the determination is sent to the RAM 42e where it is stored for use the next time the program commences.

The procedure then moves to step 114 where the actual ignition timings $\theta ig$ for the cylinder concerned (C/A=n) and the remaining three cylinders (C/A=n-1 to C/A=n-3) are averaged to obtain a mean value $\theta igave$.

Then in the succeeding step 116 there is calculated a reference ignition timing $\theta T$ for use in determining whether or not the boost pressure should be reduced.

Figures 4, 5:
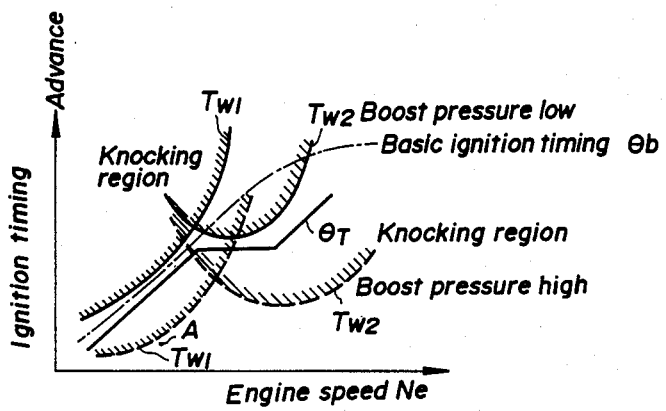
FIG. 4 is a graph explaining a reference ignition timing for determining the boost pressure reduction.
FIG. 5 is a table for explaining how the reference ignition timing is stored in a microcomputer in the control unit.

This reference ignition timing $\theta T$ will now be explained with reference to FIG. 4. In an internal combustion engine equipped with a turbocharger, since the engine is in principle operated at a high boost pressure, when the coolant temperature rises, the knocking region shifts into the retarded ignition timing region indicated by the broken-line curves Tw1 and Tw2 (high and low coolant temperatures). Therefore, the actual ignition timing $\theta ig$ is retarded with respect to the basic ignition timing $\theta b$, for example, to the value represented by the point A. (While the basic ignition timing $\theta b$ is in fact itself affected by the coolant temperature and the boost pressure, the influence of these factors is ignored here in order to simplify the explanation.) As a result, the actual ignition timing $\theta ig$ falls below (becomes more retarded than) the reference ignition timing $\theta T$. As was explained earlier, in the present invention the control operation to reduce the boost pressure begins from this time. It should also be noted that once the boost pressure has been reduced, the knocking region will shift in the direction of ignition advance, to the position indicated by the solid line curves Tw1 and Tw2, so that the actual ignition timing $\theta ig$ will again be advanced to near the basic ignition timing $\theta b$. Therefore, as will be explained later, the boost pressure is again increased with an accompanying rise in the engine output.

Further, the present invention is arranged such that the reference ignition timing $\theta T$, on which the decision whether to reduce the boost pressure is based, is varied depending on the engine operating condition, more precisely is increased or decreased depending on the engine speed and/or the intake air pressure. Specifically, similarly as the actual ignition timing $\theta ig$ is varied depending on the engine operating state, the reference ignition timing $\theta T$ is also varied. FIG. 5 shows values of the reference ignition timing $\theta T$ that are stored in the ROM 42d of the microcomputer 42 in the form of a map. The mapped values are retrieved using the engine speed Ne and the intake pressure Pb as address data. It is alternatively possible to use an arrangement which enables retrieval of the data of FIG. 5 using one or the other of the engine speed and the intake air pressure alone as the address data.

Again returning to FIG. 3, the procedure then advances to step 118 where it is determined whether the mean vale $\theta igave$ of the actual ignition timings for the four cylinders is not greater than the aforesaid reference ignition timing $\theta T$, i.e. whether the mean value $\theta igave$ is retarded beyond reference ignition timing $\theta T$, and when it is found that $\theta igave$ is more retarded than $\theta T$, it is determined that it has become impossible to eliminate knocking merely by ignition timing control. In this case, for reducing the boost pressure, the procedure first moves to step 120 where a boost pressure reduction control flag FTD, not shown, in the microcomputer is turned on and then moves to step 122 where it is determined whether a predetermined delay time has lapsed. The purpose of the delay time is to prevent hunting of the engine output caused by rapid fluctuation in the boost pressure. When it has been determined in step 122 that the predetermined delay time has lapsed, the procedure moves to step 124 in which the boost pressure is reduced. This is accomplished by turning on a solenoid (not shown) in the waste gate valve actuator 62 so as to open the waste gate valve 60 and bypass the stream of exhaust gas, thus reducing the boost pressure.

On other hand, if in the step 118 the mean ignition timing $\theta igave$ is found not to have exceeded the reference ignition timing $\theta T$ in the direction of retardation, the procedure moves to step 126 where it is determined whether the aforesaid boost pressure reduction control flag is on. If it is on, this means that knocking has just been prevented by reducing the boost pressure. Therefore, the procedure is advanced to step 128 where it is determined whether a predetermined delay time for prevention of hunting has passed, then to step 130 where the FTD flag is turned off, and then to step 132 where the solenoid (not shown) of the waste gate valve actuator 62 is turned off so as to increase the boost pressure again. On the contrary, if the FTD flag is found to be off in step 126, it is unnecessary to restore the boost pressure and the program is concluded.

This embodiment of the invention carries out knocking control separately for each cylinder and is thus able to prevent unnecessary reduction in engine output that would otherwise occur because of variance in knocking occurrence among the different cylinders, and is also able to reduce the amount of damage to the engine by increase in exhaust gas temperature. More specifically, whether or not knocking will occur depends on the shape of the combustion chamber and various other factors, all of which are likely to differ from one cylinder to another. It is thus highly likely that knocking will not occur simultaneously in all cylinders but that it will occur only in a specific cylinder or cylinders. In the case of the conventional control system, however, if, as shown in FIG. 6(a), the ignition timing at which knocking begins to occur (the knocking limit $\theta$ig in the figure) should project in the direction of retardation only for the third cylinder (i.e. in the case where knocking occurs only in the third cylinder), the initial ignition timing for all cylinders will be simultaneously shifted in the direction of retardation. With the system according the present invention on the other hand, as shown in FIG. 6(b), the ignition timing is retarded only for the cylinder concerned, i.e. the third cylinder, and the ignition timing of the mean value Oigave, which is obtained by averaging the ignition timings for all cylinders, is shifted relatively toward the advanced side. Therefore, as shown in FIG. 7, the amount of power loss resulting from the retardation of the ignition timing is only a fraction of that when the ignition timing is retarded for all cylinders (in FIG. 7, "MBT" means Minimum Advance for Best Torque). Moreover, when the ignition timing is retarded, it sometimes happens that a part of the air/fuel mixture is, without being burned, forced out to the exhaust side and burned there, causing an increase of the exhaust temperature. However, as shown in FIG. 8(a), compared with the case of the conventional system in which the timing is retarded for all cylinders at the same time, the amount of such unburned air/fuel mixture passing into the exhaust system is smaller when, as in the system according to this invention, ignition timing retardation is carried out only for a specific cylinder or cylinders. The increase in exhaust temperature is also proportionately lower. Also, as shown in FIG. 9, when the ignition timing is retarded for specific cylinders, the amount of ignition timing retardation resulting from use of a mean ignition timing obtained by averaging the ignition timings of both the retarded cylinder and the remaining cylinders is relatively small. As a result, even if the timing for initiating boost pressure reduction is determined on the basis of the ignition timing, since in the present invention the ignition timing is retarded for only a specific cylinder or cylinders, it is generally possible to eliminate knocking without reduction of the boost pressure, and even if it should become necessary to reduce the boost pressure, the time tb at which the reduction is made can be delayed when compared with the reduction time ta in the conventional system. Accordingly, as illustrated in FIG. 8(a), the degree of engine output power reduction is correspondingly small. While it was stated that the determination of the timing at which boost pressure reduction is to be initiated is determined on the basis of the ignition timing in both the conventional system and the system according to this invention, there is nevertheless a noteworthy distinction between the two systems in this respect. In the prior art system, the determination is made based on only one factor constituting the actual ignition timing, namely the amount of retardation, while in the system according to the present invention, the determination is made based on the actual ignition timing applied to the engine, i.e. based on the actual ignition timing including the amount of retardation. This makes the system according to the present invention capable of better reflecting in the engine control any changes that may occur in the engine operating and engine environment conditions, and clearly distinguishes the present system from the prior art system.

Figure 10:
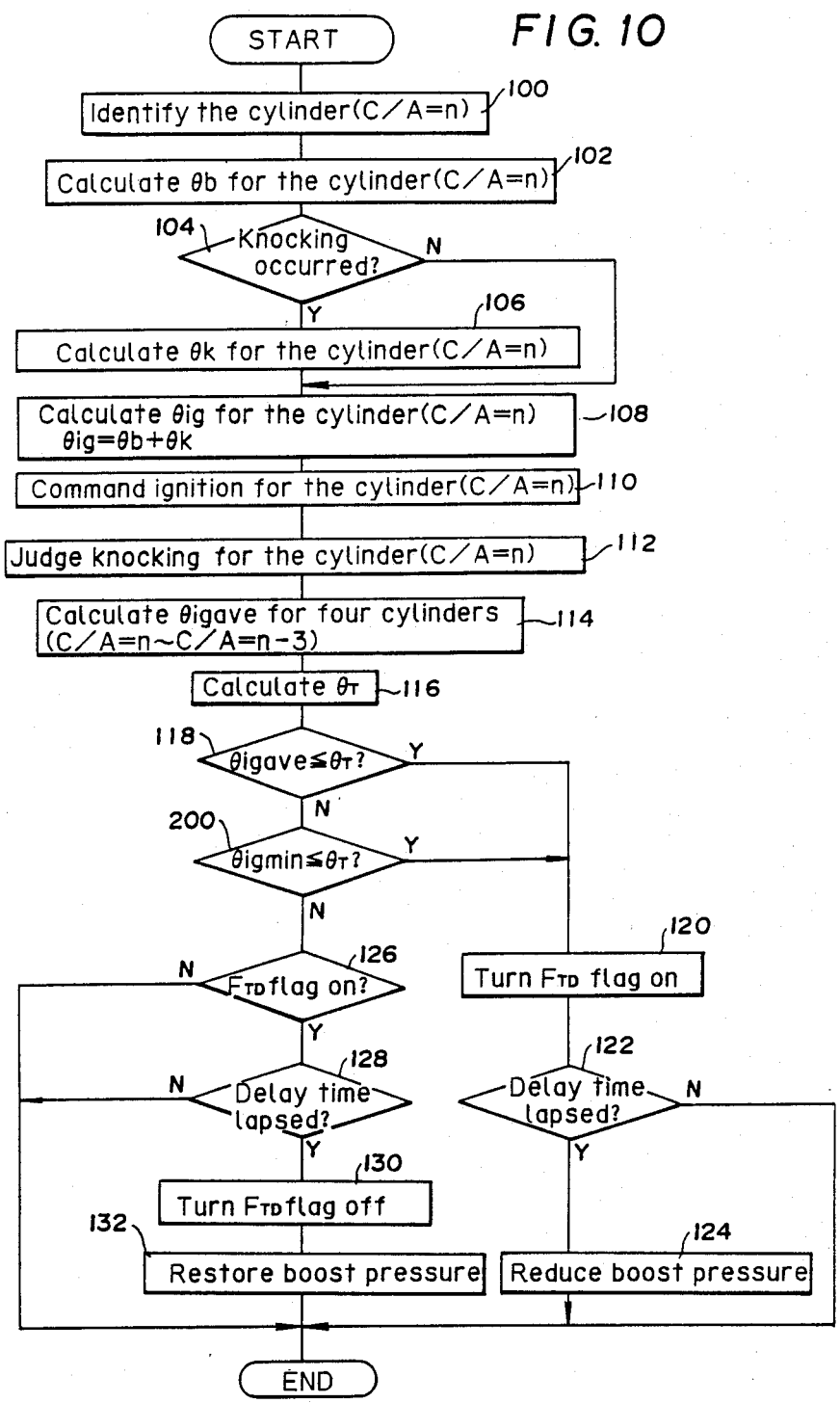
FIG. 10 is a flow chart showing the operation of a second embodiment of the invention.

FIG. 10 is a flowchart for a second embodiment of the present invention, which will now be explained with regard to how it differs from that of the first embodiment. After step 118, there is added a step 200 which modifies the system such that even if the mean ignition timing $\theta$igave is not more retarded than the reference ignition timing $\theta$T, the boost pressure is nevertheless immediately reduced if the most retarded value $\theta$igmin of the actual ignition timing among the four cylinders exceeds the reference ignition timing $\theta$T in the direction of retardation. With this modification, the system is able to provide the effects obtainable with the first embodiment plus the additional effect that the boost pressure is immediately reduced when heavy knocking occurs in even a single cylinder, even though no such reduction would be made based on a mean value. This is especially advantageous for use in engines that are particularly susceptible to damage from knocking. The remaining steps 100–118 and 120–132 are the same as those in the first embodiment.

What is claimed is:

1. A system for controlling ignition timing and boost pressure in a multi-cylindered internal combustion engine equipped with a turbocharger for applying boost pressure into combustion chambers of the engine, said system comprising:

angular position detecting means for detecting an angular position of an engine crankshaft to generate an output signal indicative of an engine speed;

engine load state detecting means for detecting a state of engine load to generate an output signal in response thereto;

knock detecting means for detecting a knock condition of an engine for respective cylinders to generate an output signal in response thereto;

ignition control means for determining a basic ignition timing for each cylinder in response to signals output by the angular position detecting means and engine load state detecting means, and said ignition control means for determining an actual ignition timing for each cylinder by retarding the basic ignition timing by an amount when the knock condition, output by said knocking detecting means, is determined for each cylinder;

ignition means for igniting an air/fuel mixture in the combustion chamber of each cylinder in response to the actual ignition timing from the ignition control means;

pressure control means for determining a reduction timing of the boost pressure applied to the combustion chamber of the engine, said pressure control means receiving the actual ignition timing from the ignition control means and calculating a mean value of the actual ignition timing for all cylinders, said pressure control means comparing the mean value with a reference ignition timing, which is determined based upon the detected engine speed and engine load, and when the mean value is found to exceed the reference ignition timing in a retard direction, said pressure control means determining reduction of the boost pressure; and actuator means for reducing the boost pressure in response to a signal from the pressure control means.

2. A system according to claim 1, wherein said pressure control means determines the boost pressure reduction when the most retarded ignition timing among all cylinders exceeds the reference ignition timing in the retard direction, even if said mean value does not exceed said reference ignition timing.

* * * * *